United States Patent [19]

Burkhardt

[11] Patent Number: 4,557,251
[45] Date of Patent: Dec. 10, 1985

[54] SOLAR WATER BOILING DEVICE

[76] Inventor: Helmut Burkhardt, 142 Balsam Ave., Toronto, Ontario, Canada, 3C1

[21] Appl. No.: 580,451

[22] Filed: Feb. 13, 1984

[51] Int. Cl.⁴ .............................................. F24J 3/02
[52] U.S. Cl. .................................. 126/417; 126/437; 126/450
[58] Field of Search ............... 126/417, 450, 444, 437, 126/426; 215/260

[56] References Cited

U.S. PATENT DOCUMENTS

| | | | |
|---|---|---|---|
| 1,865,764 | 7/1932 | Keenan | 215/260 |
| 2,405,877 | 8/1946 | Delano | 202/234 |
| 2,413,101 | 12/1946 | Delano | 202/234 |
| 3,277,883 | 10/1966 | Rowekamp | 126/450 |
| 3,918,430 | 11/1975 | Stout et al. | 126/448 |
| 4,010,080 | 3/1977 | Tsay et al. | 202/83 |
| 4,196,721 | 4/1980 | Posnansky | 126/451 |
| 4,203,427 | 5/1980 | Way | 126/9 R |
| 4,239,032 | 12/1980 | Irving | 126/450 |
| 4,281,644 | 8/1981 | Chiles | 126/451 |
| 4,479,488 | 10/1984 | Steinberg | 126/450 |

Primary Examiner—Carroll B. Dority, Jr.
Attorney, Agent, or Firm—Ridout & Maybee

[57] ABSTRACT

A solar water boiling device having an insulated enclosure with an opening in its front provided with a light-transmissive cover. Within the enclosure is a water container preferably formed as a discrete unit separable from the enclosure. The enclosure provides insulation such that heat losses through its side and rear walls are small compared with heat loss through the cover. The depth of the container measured perpendicularly with respect to the cover is 4 cm or less permitting water filling the container to be raised to the boiling point in one day of exposure to full sunlight.

9 Claims, 8 Drawing Figures

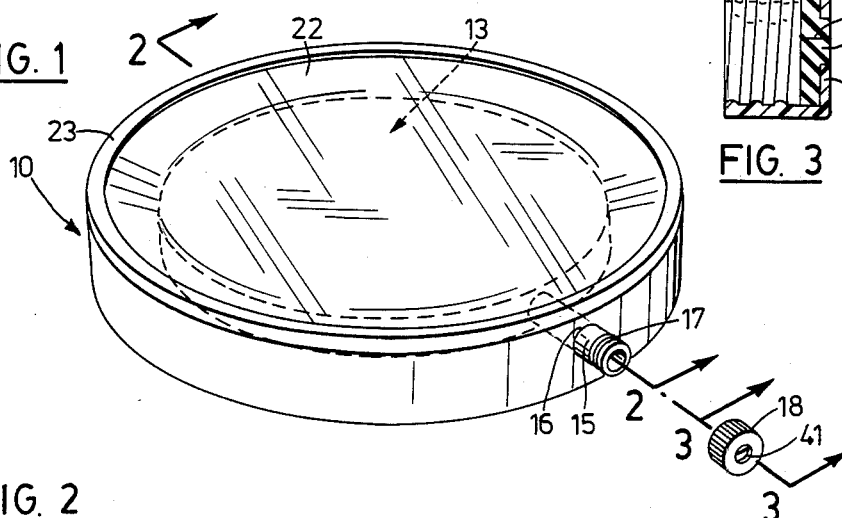
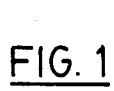
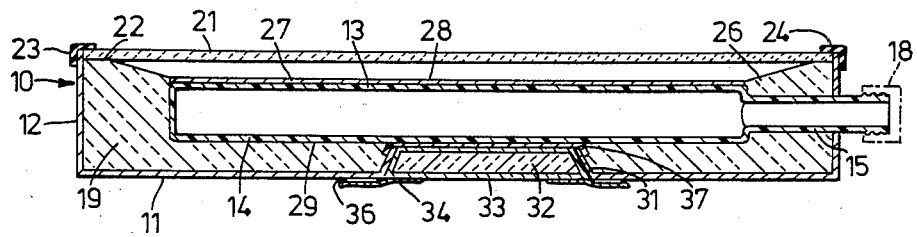
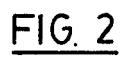
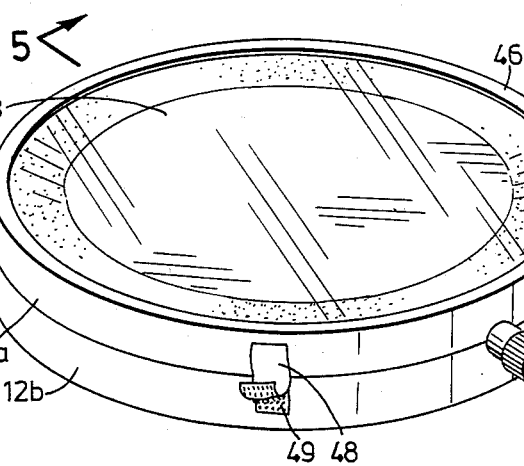
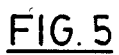
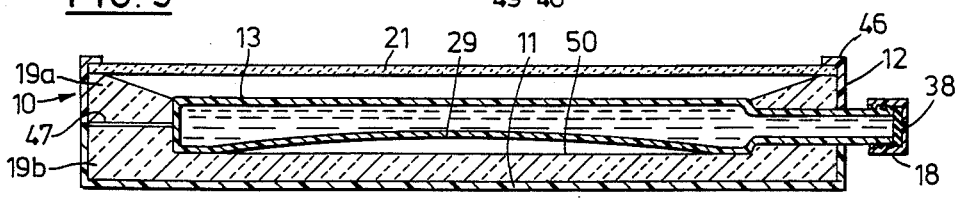

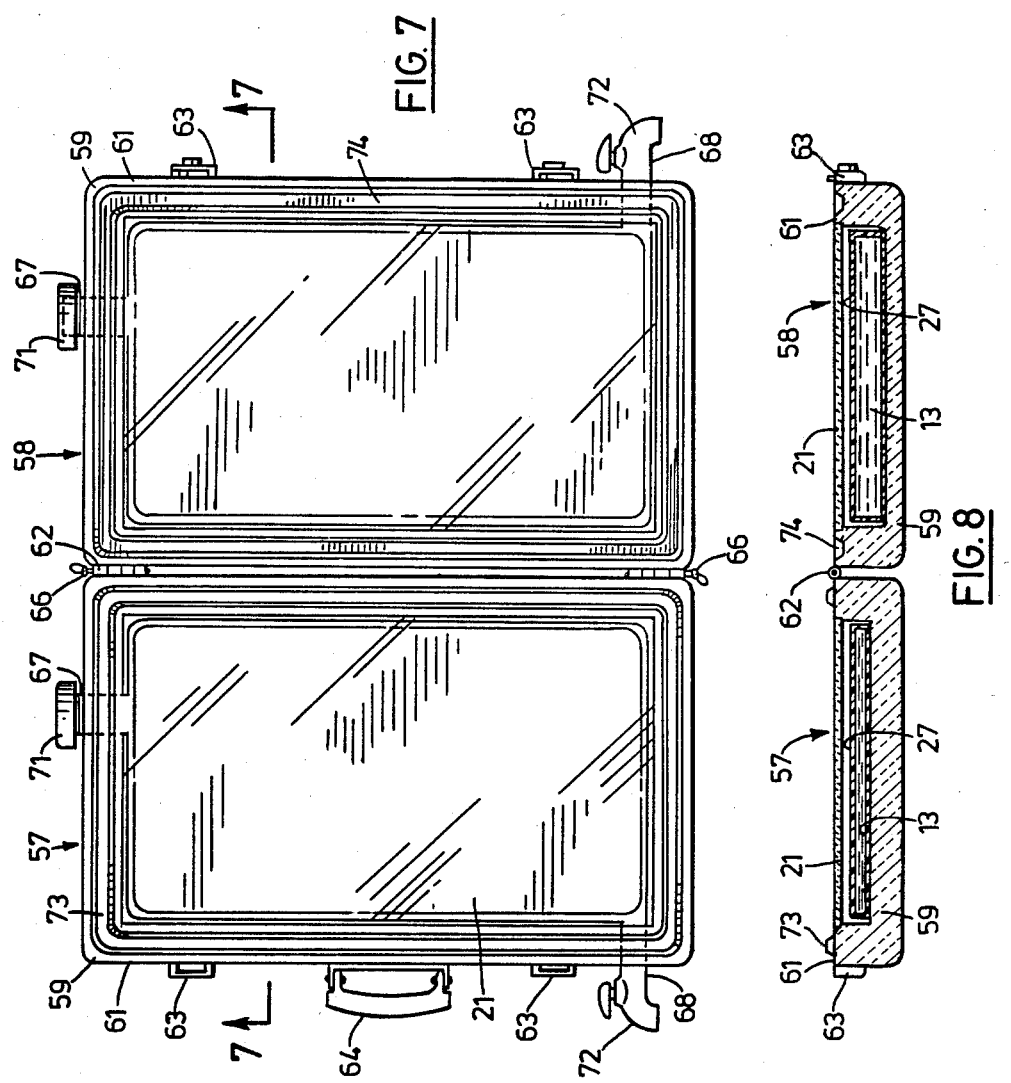

SOLAR WATER BOILING DEVICE

The present invention relates to a solar water boiling device. More particularly, the invention relates to a device which is readily portable and which can be employed to boil water for use in making hot drinks, e.g. for tea or coffee-making, or for the purpose of sterilizing water where a supply of pure water is not available.

There are known portable solar water heating devices which are capable of raising water to the temperature of normal domestic hot water supplies, such that the heated water can be used for washing, showering, or for cleansing utensils, but which, under usual conditions of exposure to sunlight, are incapable of heating the water to boiling point.

Various forms of solar heating apparatus are known which employ energy-concentrating mirrors, often controlled by automatic position adjusting arrangements, in order to concentrate sunlight on a localised spot, and which are capable of achieving temperatures above the boiling point of water, but these are complex and expensive and are too cumbersome to be readily transportable.

The invention provides a solar water boiling device wherein a water tight container is confined within a thermally insulated enclosure. The container is provided within an opening for introducing water into the container and for withdrawing water from it, and with a removable closure for sealing the opening. A front side of the enclosure has an aperture and a light transparent cover extending over the aperture. The thermal insulation on the edges and rear side of the enclosure is such that heat loss through the insulated edges and rear side is small as compared with the heat loss through the aperture and its cover. A front wall of the water-tight container is spaced rearwardly from the cover, and a light absorptive surface is provided, also spaced rearwardly from the cover and arranged to be heated by sunlight passing through the cover and to transfer its heat to the container. The inventor has found that with this device the rate of heating of the water is a function of the depth of the confined volume of water. More particularly, the rate of heating is approximately inversely proportional to the depth of water measured transversely with respect to the aperture in the enclosure, i.e. parallel to the incident rays when the front of the device is directed toward the sun. Further, it has been found that on exposure of the device to full sunlight, the rate of heating is such that a period of about one hour is required to raise the water to boiling point for each half-centimeter depth of water. In the device of the present invention, the rear wall of the container is, over its entire extent, spaced from the front wall by a distance no more than about 4 cm so that when the container is completely filled with water a depth of water of no more than about 4 cm is presented which can be raised to the boiling point after exposure for no more than about 8 hours i.e. a typical period of duration of full sunshine on an average summer's day. It is desirable to completely fill the container as the presence of bubbles or pockets of air within the container greatly reduces the efficiency of heat transfer to the water and may give rise to problems of excessive pressures being generated within the container owing to the relatively large volume coefficient of expansion of air.

Under the pressure of steam generated within the closed container when the water reaches the boiling point, the front and rear walls of the container tend to bulge outwardly while the edges of the container tend to be drawn inwardly. The container is desirably formed as a discrete unit that is structurally independent of the enclosure and of the thermal insulation material, to avoid movements of the walls of the container imposing strains on the structure of the device. In one form, the container unit is a one piece moulded plastic flask. Desirably, at least one wall of the flask or other container unit is flexible, and the enclosure has a rear side portion which is separable from the edge portion of the enclosure so that access may be had to the container unit, to permit boiling water to be taken from the device by compressing the container unit, without introducing air into the container unit, or to permit the container unit to be removed and replaced by some other item which may be heated by solar radiation.

Advantageously, the tendency of the walls of the container to bulge when the water reaches boiling point is made use of by arranging for the bulging wall to press on the underside of the cover or on a separable rear side portion of the enclosure and to disengage the cover or separable rear side portion rearwardly to a partially open condition, thus permitting substantially increased heat loss from the container, so that risk of overheating and rupture of the container is reduced or avoided.

Embodiments of solar water boiling devices in accordance with the invention are described in more detail below, by way of example only, with reference to the accompanying drawings, in which:

FIG. 1 shows a perspective view of one form of water boiling device in accordance with the invention;

FIG. 2 shows a cross-section of the device taken on the line 2—2 in FIG. 1;

FIG. 3 shows a cross-section on an enlarged scale of a closure for the device, taken on the line 3—3 in FIG. 1;

FIG. 4 shows a second embodiment of a water boiling device in accordance with the invention;

FIG. 5 shows a cross-section of the device taken on the line 5—5 in FIG. 4;

FIG. 7 shows a plan view of a water boiling assembly in accordance with the invention, in open position; and FIG. 8 shows a cross-section of the device of FIG. 7, taken on the line 8—8.

Figure 6:
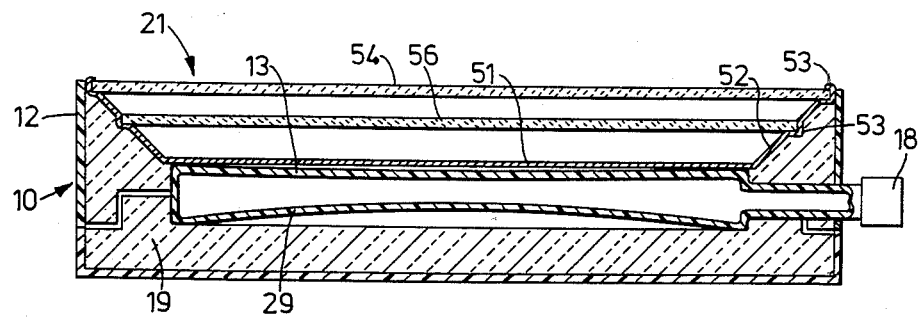
FIG. 6 shows a cross-sectional view corresponding to FIG. 2 of a third embodiment of a device in accordance with the invention.

Referring to the drawings, in which like reference numerals indicate like parts, the device shown in FIGS. 1 and 2 has a thermally insulated enclosure 10 formed by a shallow cylindrical shell e.g. of metal or plastic having a circular back 11 formed integrally with a cylindrical side wall 12. Within the device is disposed a flask 13 having a relatively thin flat circular body portion 14 provided with an elongated neck 15 of small diameter as compared with the thickness of the body 14. The neck 15 protrudes outwardly through the side wall 12 through an opening 16. The flask 13 and neck 15 may be formed of metal e.g. aluminum or copper, but are more preferably formed as a one-piece plastic moulding. The outer end of the neck 15 is formed with a screw thread 17 to receive threaded closure cap 18.

Between the side and bottom walls of the enclosure and the flask 13 is arranged thermal insulation material 19. Across the opening defined by the front or upper edge of the side wall 12 is supported a circular light tranmissive cover 21 e.g. of glass or transparent or translucent plastic. The edge of the cover 21 rests loosely on a flat annular upper edge 22 of the insulation material 19, and is retained in place by a resilient e.g. rubber ring 23 secured to the outer edge of the side wall 12 and having an inwardly directed annular lip portion 24 engaging the edge of the cover 21. In the preferred form, as shown, an inner upper surface edge 26 of the insulation material 19 inclines downwardly and inwardly from the cover 21 toward a front or upper wall 27 of the flask 13 providing a frustroconical surface 26 which is desirably made strongly light-absorptive e.g. by a coating of black paint. A thin circular metal plate 28 rests on the front wall of the flask 13 and is loosely retained in position e.g. by having its circumferential edge received in an annular recess formed in the adjacent surface of the insulation material 19. The front side of the plate 28 is made strongly light-absorptive e.g. with a coating of black paint. Thus, on exposure of the device to sunlight, light entering through the cover 21 is absorbed by the surface 26 and by the light-absorptive surface of the plate 28 and these surfaces become heated. In accordance with well-known principles, heat energy tends to be accumulated within the device, owing to the air spacing between the cover 21 and the surface 26 and the plate 28. This heat is transferred by convection and conduction to the contents of the flask 13. In use, the flask 13 is completely filled with water, so that there are no bubbles or pockets of air within the flask, and the flask is closed by applying the closure cap 18.

When the air space beneath the cover 21 and the water contained within the flask 13 are heated, heat losses do of course occur, predominantly by conduction and re-radiation through the cover 21. Some heat loss occurs also by convection through losses of hot air from within the enclosure 10 and the cover 21, but these can be minimized by having the cover 21 fit tightly and snugly within the enclosure 10 and on the upper surface 22 of the insulation 19, and by having the neck 15 of the flask fit as tightly as possible within the opening 16 within the portions of the insulation 19 through which it extends. Gasket-like pads of soft compressible material, such as cloth may be applied between the interengaging surfaces to further reduce heat losses.

Typically, in the case in which the cover 21 is of glass, the cover 21 will afford thermal insulation corresponding to an R value of about 1 or more (North American units) so that under steady state conditions in full sunshine, a temperature difference of about 110° C. or more can be sustained between the environment and the inner side of the cover 21. Plastic glazing materials having an R value above 1, e.g. about 2, may be used, for example, light transmissive cellular plastic materials such as the so-called corrugated plastic sheeting having two facing sheets united by spaced longitudinal ribbing forming internal channels. Further, double glazed units may be used for the cover 21. With these, somewhat higher temperature differences may be sustained. The nature and thickness of the insulation material 19 employed is such that temperature losses through the insulation material extending along the sides and bottom wall of the flask 13 are small compared with heat losses through the cover 21. Desirably, the insulation material will achieve a level of thermal insulation corresponding to an R value of about 4, and preferably much higher, e.g. about 7 or 8 (North American units). Preferably, the material 19 provides thermal insulation of the kind referred to as "superinsulation".

As noted above, the rate of heating of the water contained within the flask 13 is a function of the depth of the water in the flask. With the above arrangement, a depth of water of about one-half cm may be raised to the boiling point for each hour of exposure to usual conditions of full sunlight, at least under the conditions of insolation prevailing in summer months. It is desired to provide a volume of boiling water adequate for use in making hot drinks e.g. tea or coffee, and to restrict the width or diameter dimension of the device to about 30 cm which will enable the device to be readily transported and placed in positions or locations where it may conveniently be exposed to sunlight e.g. on the dash or in the rear window of a car, or by having the device suspended on the rear surface of a backpack or rucksack. In order to provide an adequate volume of water, while still permitting the device to raise water to the boiling point in an acceptably short period, desirably the flask 13 is formed with its thickness dimension e.g. the spacing between its front wall 27 and its back wall 29 in the range about 0.5 to about 3 cm. More preferably, this spacing is about 1 cm to about 2 cm.

In the preferred form, as shown in FIG. 2, an opening 31 is formed through the back 11 of the enclosure and through the adjacent portion of the insulation material 19. In the example illustrated, the opening 31 is circular, and has upwardly and inwardly tapering sides, and is normally closed by a plug 32 comprising a frustroconical section of the insulation material encased within a shell 33 e.g. of metal or plastic. The opening 31 is to permit a source of heat such as a flame from a gas burner or from a source having a relatively low heating power e.g. a candle flame, to be applied direct to the back wall 29 of the flask 13 when it is desired to boil water after dark. The plug 32 is normally retained within the opening 30 by releasable fasteners e.g. fastener tapes of the hook and loop fastening type, such as those available under the trade mark VELCRO. As shown in FIG. 2, these tapes 34 may be fastened at one end to the plug 32 and at the opposite end to a pad 36 of the fastener tape material secured to the underside of the back 11. Where, as in the preferred form, the flask 13 is moulded from plastic, desirably the underside of its back wall 29 adjacent the opening 13 is covered with a piece of heat-resistant conductive metal foil e.g. copper foil 37 secured at its edges around the periphery of the opening 30, to avoid risk of the flask 13 being melted by the applied flame. With the above-described arrangement, wherein the flask 13 is maintained within a well-insulated enclosure, it will be possible to raise the water contained within the flask to the boiling point employing a source of heat applied through the opening 30 within a relatively short time e.g. within a matter of about 2 or 3 hours depending on the quantity of water present in the flask 13, even when only a very weak source of heating, such as a candle flame, is employed.

In the preferred form, as shown, the flask 13 is formed as a discrete, separable unit, which is entirely structurally independent of the enclosure 10 and the thermal insulation material 19. Thus, the flask 13 rests freely within a recess defined by the thermal insulation material 19, and is free to expand and contract without imposing strains on the insulation material 19 or on the enclosure. In the preferred form, the walls of the flask 13 are relatively thin and flexible, so that when the device is exposed to sunlight and the water within the flask brought to the boiling point, the pressure of boiling water within the flask 13 causes the major walls i.e.

its front and back walls 27 and 29 to bulge outwardly. The bulging of the side walls of the flask can be utilised to limit the heating of the flask when the device is exposed to sunlight, to avoid risk of overheating and rupture of the flask. With the bulging of the side walls, the front wall 27, together with the thin metal plate 28, tends to bulge upwardly until they contact the lower surface of the cover 21. At this point, an air space is no longer maintained between the cover 21 and the plate 28, and there is greatly increased heat loss from the device as a result of direct conduction through the material of the cover 21. Any further heating of the water within the flask 13 will result in increased internal pressure within the flask 13 causing the upper wall 27 and plate 28 to press on the underside of the cover 21 to the point at which the upward force overcomes the restraining force of the resilient annular lip 24 of the ring 23, and deflects the lip 24 upwardly so that the cover 21 snaps upwardly to an open position in which at least a portion of its edge is disposed upwardly above the lip 24, thus providing a gap through which the space behind the cover 21 communicates with the atmosphere. In this condition, there is still greater heat loss as a result of convection cooling between the environment and the interior of the device, permitting the water contained within the flask to cool rapidly to below the boiling point. The plug 31 and its fastening means 34 may likewise be arranged so that, on downward bulging of the back wall 29, the fastener means 34 are released, allowing the plug 31 to pop out to an open position permitting further heat loss from the interior of the device.

It may be mentioned that, instead of employing the light-absorptive metal plate 28, a light-absorptive surface may be provided by a black coating, e.g. black paint, applied direct on the upper surface of the front wall 27 of the flask. Alternatively, the front wall 27 of the flask is formed from light-transmissive material, e.g. transparent or translucent plastic, and a light-absorptive coating provided on the back wall 29 or on the upper surface of the insulation material 19 immediately beneath the back wall 29. In further forms, the entire flask 13 may be formed from light-absorptive material e.g. a black pigmented plastic.

To further guard against pressure within the flask resulting in an explosive rupture, in the preferred form the closure cap 18 is provided with a pressure relief valve. This may consist of a disc of heat resistant resilient material e.g. silicone rubber 38 lodged within the cap 18 adjacent an end wall 39 which is provided with a small opening 41. A thickened portion 42 of the disc 38 extends within the opening 41 and through this a slit 43 is formed extending along a central portion of the diameter and fully through the thickness of the disc. The disc 38 and the portion 42 may be made slightly oversize in relation to the internal dimensions of the cap 18 and opening 48, so that the disc is maintained under a definite inwardly directed compressive force, tending to close the slit 43. When elevated pressure is generated within the flask 13, the portions of the disc bordering the slit 43 tend to be deflected outwardly, thus opening the slit out to provide a vent through which pressure within the flask may be relieved to the outside. To guard against boiling water tending to spray out of the opening thus formed, the closure cap 18 may be enclosed by a cover of cloth or the like, which will absorb water issuing from the vent opening, and will limit spraying.

It is of course important that the flask 13, the insulation material 19, and the cover 21 should be capable of withstanding the temperatures to which they are subjected in use, without unduly softening or becoming permanently deformed. In the case of the flask 13, it is also of course important that this should be sufficiently strong at boiling water temperatures to withstand the internal pressure. Examples of suitable plastics materials which may be used for the flask 13 include polycarbonates, higher melting grades of polyethylene and polypropylene, and high melting cross-linked polyethylene and polypropylene materials. The cover 21 may be of glass, or of any of the plastics materials mentioned above. The insulation material 19 may be expanded polystyrene, glass fibre insulation material, or expanded or foamed versions of any of the above-mentioned plastic materials.

A further advantage of forming the flask 13 as a structurally independent unit is that this permits the flask 13 to be removed from the device to allow some other form of heat-requiring device to be placed within the insulated enclosure, e.g. a metal tray in which food items or other articles required to be heated can be placed. In such case, the opening 16 in the side wall 12 and the corresponding opening in the insulation material 19 through which the neck 15 passes can be closed with a stopper of thermally insulative material. Further, when the flask 13 is removed from the device while containing hot water therein, hot water can be expelled from the device by compressing its walls 27 and 29 without allowing air to enter the flask. In the example shown in FIGS. 1 and 2, water can also be expelled from the flask, without air entering, by removing the plug 32 and applying finger pressure to the flexible back wall 29. To assist in removing the flask from and reinserting the flask into the device, the neck 15 may be relatively thin walled and flexible e.g. it may have a thin walled flexible portion adjacent its point of connection to the body 14 to allow the body 14 to flex upwardly relative to the neck 15 and permit manipulation of the flask, normally with the cover 21 removed, so as to allow the neck portion 15 to be withdrawn from or inserted into the passageway through the insulation material 19 and through the opening 16 in the side wall 12. With the example illustrated in FIGS. 1 and 2, as will be readily appreciated, with the plug 32 removed from the bottom of the device, finger pressure may be applied to the underside of the flask to lever the body 14 of the flask 13 upwardly to disengage the cover 21. In the example shown in FIGS. 4 and 5, the cover member 21 is retained rigidly on the front surface of the device by an inwardly extending lip portion 46 of the side wall 12. The enclosure 10 in this instance is formed in separable upper and lower halves. Thus, the insulation material 19 is formed in two distinct upper and lower sections, namely an edge portion 19a and a rear wall portion 19b, while the side wall 12 is formed in upper and lower sections, namely an edge portion 12a and a rear wall portion 12b, the former being formed integrally with the inwardly projecting lip 46 that retains the cover 21, and the rear wall portion 12b being formed integrally with the back wall 11. These halves are held pressed together in snug face to face engagement along a plane 47 coincident with the opening and passageway receiving the tubular neck portion 15, and are held together by releasable fastener devices e.g. hook and loop fastener tapes of the above mentioned VELCRO (trade mark) material e.g. with a tape 48 secured to the upper half 12a of the side wall, and a co-operating fastener pad 49 secured to the lower half 12b of the side wall. The flask 13 is in the example shown formed as a one-piece moulding from a black heat-resistant plastic material, and, in its as-manufactured condition, its back wall 29 is formed with a dished or concave curvature. In use, under pressure of boiling water within the flask 13, the back wall 29 bulges downwardly into contact with the adjacent surface 50 of the insulation material 19 until the pressure exerted on the insulation material 19 is sufficient to overcome the retaining force of the fastener tapes 48 and 49, causing the enclosure to split open along the plane 47, thus exposing the flask 13 to cooling by contact with the outside air. Thus, overheating of the flask and risk of explosive rupture of the flask can be avoided.

As with the example shown in FIGS. 1 and 2, as a further safety measure, the closure cap 18 can be provided with a pressure relief device 38 as above described.

As will be appreciated, the device may include a thin light-absorptive plate, similar to the plate 28 positioned above and in contact with the front wall 27 of the flask, or this front wall may itself have a light-absorptive coating on it, or the front wall 27 may be of light transmissive material, and either the back wall 29 of the flask or the upper surface of the insulation material 19 may be provided with a black light-absorptive coating.

FIG. 6 shows a further example in which the cover 21 is formed a double glazed sealed unit comprising a supporting frame having a circular base plate 51 resting on and in contact with the upper side of the flask 13. A frustroconical side wall 52 extends upwardly from the plate 51 and has circumferential grooves or recesses 53 which receive the edges of upper and lower parallel spaced circular glazing pieces 54 and 56. The upper surfaces of the base plate 51 and of the side wall 52 are made light absorbing e.g. with a coating of black paint, and the edges of the glazing pieces 54 and 56 are sealed to the side wall 52 with gasketing or sealant materials to define a sealed space between the pieces 54 and 56 and between the pieces 56 and the plate 51. Desirably, the wall 52 is made of thermally insulating material or has thermal breaks in it to prevent loss of heat from the plate 51 to the surroundings. This arrangement has the advantage that ingress of dust to the interior of the sealed unit is prevented so that there will be no tendency for dust to accumulate on the base plate 51 or on the interior surfaces of the glazing pieces 54 and 56 to the detriment of their light absorbing and light-transmissive properties.

In the example shown, the upper edge of the side wall 52 of the sealed unit is secured to the side wall 12 of the enclosure, and the side wall 12 and the insulation material 19 are each formed in separable upper and lower halves, as in the example shown in FIGS. 4 and 5, so that when water in the flask 13 reaches the boiling point a concave rear wall 29 of the flask bulges downwardly and snaps open the lower half of the side wall 12 together with the lower portion of the insulation 19 to expose the flask 13 to the atmosphere and permit cooling. The mating upper and lower surfaces of the insulation material 19 may be provided with a stepped configuration as shown which intergage in a snap fit or friction fit. This can avoid the need for external retaining means such as the tapes 48 and 49 to retain the halves of the insulating enclosure together.

Alternatively, the sealed double-glazed unit may be retained by a resilient retaining ring such as the ring 24 employed in the embodiment of FIGS. 1 and 2, so that the base plate 51, side wall 52 and glazing pieces 54 and 56 are displaced upwardly as a unit on upward bulging of the upper wall of the flask 3 when the contents reach the boiling point.

The above-described versions of the device can be supplied to the user along with a thermally insulative lid to be applied over the light-transmissive cover 21 or with a thermally insulative bag or other thermally-insulated cover in which the device may be placed after water has been boiled therein during a period of insolation, so that the water may be kept hot for a longer period. Desirably, where such insulative cover in the form of a lid or bag is provided, it should be capable of keeping the water at a temperature above about 60° C. (a usual domestic hot water temperature) for a period of at least about 3 hours, representing a typical period between sundown and midnight.

The need to provide a thermally insulating cover may be avoided by employing an assembly such as illustrated in FIGS. 7 and 8, wherein there are two similar solar water boiling devices 57 and 58, each device having a thermally-insulating enclosure 59, with the insulation material including an upper face 61 extending upwardly to at least the level of the upper surface of the light transmitting cover 21 of each device, whereby when the two devices are brought together face to face, the upper faces 61 engage together snugly to form a complete thermally-insulative envelope or jacket around the water-containing flasks 13 of the respective devices.

As illustrated, the arrangement may conveniently form a folding briefcase-type structure, the devices 57 and 58 being hinged together by hinge members 62 along one edge, and the opposite edges of each device being provided with cooperating latch portions 63, so that the two devices can conveniently be latched together in the closed or folded position. One device may be provided with a carrying handle 64.

Advantageously the front wall to rear wall spacing of the water-containing flask 13 in one device is greater than that of the flask 13 in the other, so that the relatively shallow or thin flask, in this example the flask 13 in the device 57, can more quickly be brought to the boiling point on exposure to sunlight, while a somewhat greater quantity of water present in the relatively deep or thick flask is being heated more slowly in the device 58.

Desirably, the hinge connections 62 between the two devices are separable e.g. by withdrawal of a removable pin 66 from each hinge, so that the devices may be used separately and water may be withdrawn from one of the devices 57 and 58, while the other is undergoing heating.

As will be appreciated, each of the devices 57 and 58 may incorporate the features of the devices described above with reference to FIGS. 1 to 6. Thus, for example, each flask 13 may be surmounted by a thin metal light-absorptive coated plate similar to the plate 28, the upper surface 27 of each flask may be provided with a light absorptive coating, the rear wall of each flask 13 may be light-absorptive, the flask 13 may be of light-transparent plastic, and the upper surface of the insulation immediately underneath the flask 13 may have a light-absorptive coating, or each of the flasks 13 may be formed from a black light-absorptive material. The light-transmissive covers 21 may be in the form of a double glazed sealed unit as in FIG. 6 and may be secured to the inner edges of the upper faces 61 of the insulation material 59, or may be retained by releasable retainer means e.g. similar to the resilient annular lip 24 described above with reference to FIGS. 1 and 2, so that on bulging of the flask 13 under internal pressure of boiling water, the cover 21 may be displaced upwardly to limit or avoid further heating of the flask 13. Further, although in the example shown the insulation material 54 in each device is shown as a solid unit it will be appreciated that it may be formed into separable front and rear halves releasably retained together as in FIGS. 4 and 5 or in FIG. 6, so that the rear side of the insulation material may be snapped to an open position when the flask 13, having initially a dished or concave back wall similar to the back wall 29 shown in FIG. 5, bulges downwardly under pressure of water boiling within the flask 13, and to permit ready access to the interior of the device so that the flask 13 may be removed, and an alternative item requiring heating, e.g. a food pan, may be substituted.

To facilitate introduction of water into and withdrawal of water from the flasks 13, each flask is formed with an inlet neck 67 and an outlet neck 68, each extending outwardly through a respective passageway formed through the side wall of the insulation material 59. Each of these necks 68 and 69, from its root or point of connection to the side wall of the flask 13 and outwardly to its end extending beyond the side wall of the insulation material 59, may have a relatively shallow and flat configuration e.g. approximately transversely elongated rectangular cross-section which is united at its outer end e.g. by plastic welding, to a circular fitting. In the case of the inlet neck 67, the fitting receives a threaded closure cap 71, which, like the closure cap 18 illustrated in FIG. 3 may be provided with a resilient insert similar to the disc 38 providing a pressure relief valve.

On the outlet neck 68, a spigot 72 may be provided, through which hot water may be drawn from the flask 13 after removing the closure cap 71 to permit air to enter to displace the water. Alternatively, as with the versions described with reference to FIGS. 1 to 6, where the cover 21 is removable, or where the insulation material 59 is openable to permit access to the flask 13, water may be expelled from the flask 13 by compressing the sides of the flask, without allowing air to enter the flask.

The upper edge of the insulation material 59 adjacent the cover 21 may be formed with co-operating projections and recesses which interengage when the two devices are placed together face to face, so as to form a somewhat tighter seal between the two halves of the arrangement in its closed or folded position. In the example illustrated, one device 57 is formed with an endless rib 73 extending on the upper face of the insulation material 59 adjacent the cover 21, while the other unit 58 has on the upper face 61 of its insulation material 59 a corresponding groove or channel rib 74 which receives the rib 73 in the folded or closed position.

Instead of having the two devices 57 and 58 connected together by hinges, the sides of each device may be provided with latches or other means for releasably holding the two devices together in face-to-face relationshp.

I claim:

1. A portable solar water boiling assembly comprising two solar water boiling units each comprising: an enclosure with an aperture in its front side; a light transmissive cover extending over the aperture; thermal insulation material on the edges and rear side of the enclosure such that heat loss through the edges and rear side is small as compared with heat loss through the aperture and cover therefor, the insulation material including an edge portion surrounding the periphery of the cover; means forming a water-tight container within the enclosure and comprising a front wall generally parallel to and spaced rearwardly of the cover, a rear wall generally parallel to the front wall and spaced rearwardly therefrom over its entire extent by a distance no more than about 4 cm, means forming an opening in the container for introducing water into and withdrawing water from the container, and a removable closure for sealing the opening; and means providing a light absorptive surface extending generally parallel to the cover and spaced rearwardly therefrom, and adapted to be heated by light passing through the cover and to transfer its heat to the container; the two units being disposed with their covers in face to face relationship and with the edge portions of the insulation material superimposed in snug face to face register, whereby said insulation material forms a complete thermally-insulative envelope around the two container forming means; and a releasable connector connecting the two units together in said face to face relationship, the connector being releasable to permit the units to be separated one from the other, so that each unit can be used independently of the other.

2. An assembly as claimed in claim 1 wherein the front wall to rear wall spacing of the container of one of said units is greater than that of the other.

3. An assembly as claimed in claim 2, wherein said spacing in said one container is about 1 to about 4 cm and the spacing in said other container is 0.5 to about 2 cm.

4. An assembly as claimed in claim 3 wherein said spacing in said one container is about 2 cm and the spacing in said other container is about 1 cm.

5. An assembly as claimed in claim 1 wherein each unit is generally rectangular and said releasable connector comprises a hinge connecting the two units together along adjacent edges whereby the devices can be pivoted between open and closed positions the hinge having a pin which can be withdrawn to permit the two units to be separated.

6. A solar water boiling device comprising: an enclosure with an aperture in its front side; a light transmissive cover extending over the aperture; thermal insulation material on the edges and rear side of the enclosure such that heat loss through the edges and rear side is small as compared with heat loss through the aperture and cover therefor; means forming a closed water-tight container within the enclosure and comprising a front wall generally parallel to and spaced rearwardly of the cover, a rear wall generally parallel to the front wall and spaced rearwardly therefrom over its entire extent by a distance no more than about 4 cm, means forming an opening in the container for introducing water into and withdrawing water from the container, and a removable closure sealing the opening; and means providing a light absorptive surface extending generally parallel to the cover and spaced rearwardly therefrom, and adapted to be heated by light passing through the cover and to transfer its heat to the container; the enclosure comprising an edge portion and a rear wall portion separable from the edge portion and connected thereto by releasable connector means, and wherein at least the rear wall of the container is flexible and is adapted to bulge rearwardly under internal pressure when the water in the container reaches boiling point and to press on the rear wall portion of the enclosure, and said connnector means are adapted to release the rear wall portion under pressure of said bulging rear wall to permit the enclosure to gape open and permit cooling of the container.

7. A solar water boiling device comprising: an enclosure with an aperture in its front side; a light transmissive cover extending over the aperture; thermal insulation material on the edges and rear side of the enclosure such that heat loss through the edges and rear side is small as compared with heat loss through the aperture and cover therefor; means forming a closed water-tight container within the enclosure and comprising a front wall generally parallel to and spaced rearwardly of the cover, a rear wall generally parallel to the front wall and spaced rearwardly therefrom over its entire extent by a distance no more than about 4 cm, means forming an opening in the container for introducing water into and withdrawing water from the container, and a removable closure sealing the opening; and means providing a light absorptive surface extending generally parallel to the cover and spaced rearwardly therefrom, and adapted to be heated by light passing through the cover and to transfer its heat to the container; the front wall of the container being flexible and adapted to bulge forwardly under internal pressure when water in the container reaches boiling point and to press on the underside of the cover, and the cover being retained on said enclosure by retainer means adapted to release at least a portion of the edge of said cover forwardly when the container front wall presses on the underside thereof, to allow cooling communication between the atmosphere and the space between the cover and the front wall of the container.

8. A solar water boiling device comprising: an enclosure with an aperture in its front side; a light transmissive cover extending over the aperture; thermal insulation material on the edges and rear side of the enclosure such that heat loss through the edges and rear side is small as compared with heat loss through the aperture and cover therefor; means forming a closed water-tight container within the enclosure and comprising a front wall generally parallel to and spaced rearwardly of the cover, a rear wall generally parallel to the front wall and spaced rearwardly therefrom over its entire extent by a distance no more than about 4 cm, means forming an opening in the container for introducing water into and withdrawing water from the container, and a removable closure sealing the opening; and means providing a light absorptive surface extending generally parallel to the cover and spaced rearwardly therefrom, and adapted to be heated by light passing through the cover and to transfer its heat to the container; the enclosure comprising an edge portion and a rear wall portion separable therefrom, the edge portion and rear wall portion interengaging in a snap fit, and wherein at least the rear wall of the container is flexible and is adapted to bulge rearwardly under internal pressure when the water in the container reaches boiling point and to press on the rear wall portion of the enclosure, and snap the rear wall portion to an open position to expose the container to the atmosphere and permit cooling.

9. A device as claimed in claim 7 wherein the retainer means comprise a resilient lip on the enclosure engaging a front edge of the cover, the pressure of the container on the underside of the cover causing the lip to deflect upwardly and permit the cover to snap upwardly, to allow said cooling communication.

* * * * *